(12) United States Patent
Bartholomä et al.

(10) Patent No.: US 6,283,510 B1
(45) Date of Patent: Sep. 4, 2001

(54) ANGLE SHAPED LINE ENTRANCE WITH A DISCONNECT BETWEEN THE BRANCHES

(75) Inventors: Mario Bartholomä, Winden; Fritz Zügel, Waldkirch; Volker Götz, Kenzingen; Jürgen Adolf, Denzlingen, all of (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 0 days.

(21) Appl. No.: 09/314,434

(22) Filed: May 18, 1999

(30) Foreign Application Priority Data

Jun. 10, 1998 (GB) .............................. 198 25 989

(51) Int. Cl.$^7$ ..................................... F16L 27/00
(52) U.S. Cl. .......................... 285/184; 285/179
(58) Field of Search .................. 285/179, 283, 285/184, 118

(56) References Cited

FOREIGN PATENT DOCUMENTS

| 3403772 A1 | 8/1985 | (DE) . |
| 34 03 772 C2 | 4/1987 | (DE) . |
| 0 283 575 A2 | 9/1988 | (EP) . |

OTHER PUBLICATIONS

Office Action from German Priority Application 198 25 989.1 dated Feb. 4, 1999 and translation of pertinent portion.

Primary Examiner—Teri Pham Luu
(74) Attorney, Agent, or Firm—Akin, Gump, Strauss, Hauer & Feld, L.L.P.

(57) ABSTRACT

An angle-shaped line entrance (1) has two branches (3) and (4) set at angles to each other and functions for the attachment to a wall (2) or a housing in the area of a corresponding hole-shaped opening. In this way, oblong structures, for example, hoses (5) or cables or the like, can be guided and affixed on or through the wall (2), such that the corresponding oblong structures enter into the first branch (4), while the second branch (3) itself is connected to the housing or its wall (2). In the angular area, the two branches (3) and (4) can be swung relative to each other, so that they can also take on an aligned position. Locking in the angular usage position is done by coupling via a movement for the attachment of the oblong structure at least in the first branch (4), in such a way that both movements can be performed with the same activation component.

10 Claims, 5 Drawing Sheets

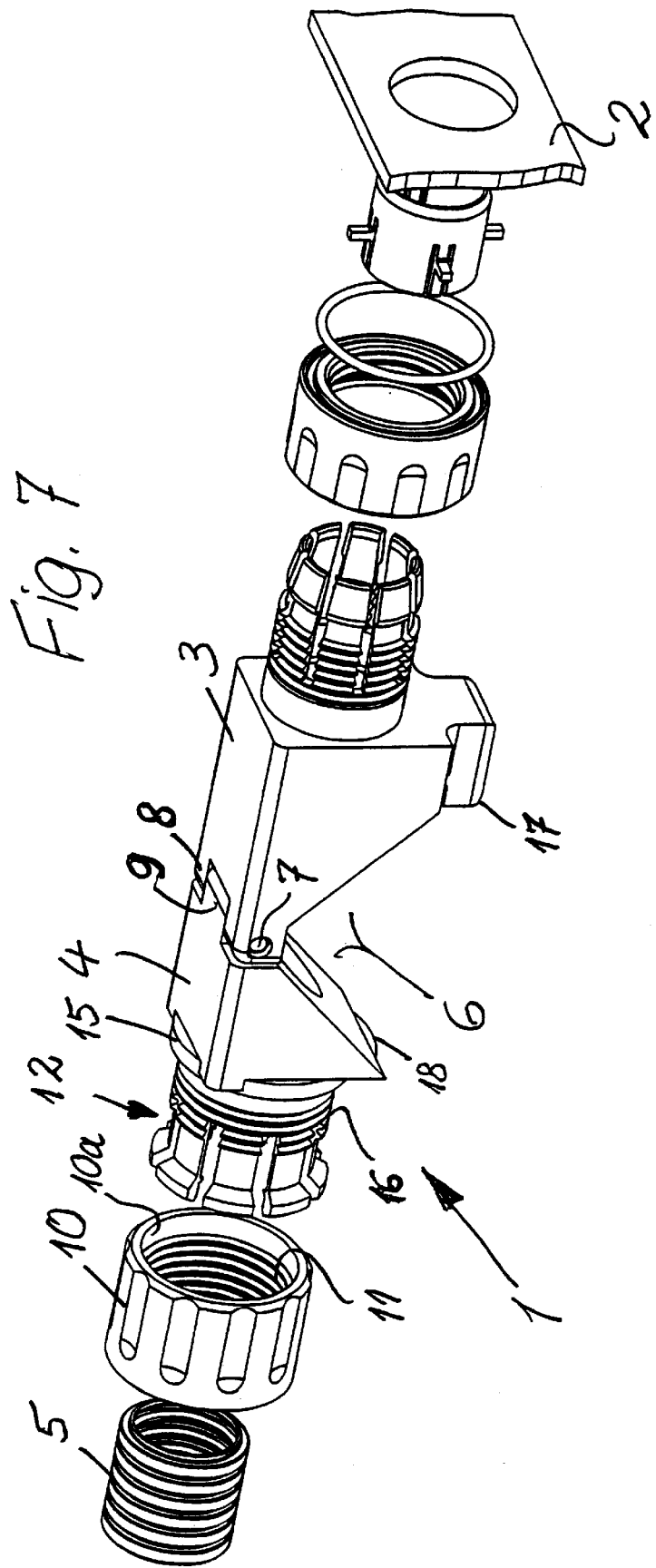

ANGLE SHAPED LINE ENTRANCE WITH A DISCONNECT BETWEEN THE BRANCHES

BACKGROUND OF THE INVENTION

The invention relates to an angle shaped line entrance with two branches situated at an angle relative to each other for the entrance and/or attachment of oblong structures, for example of electrical lines, cables or hoses, at an angle in, through or on a wall or a housing, such that the oblong structure runs slanted or parallel to the surface of the wall and in particular, enters at approximately at a right angle or slanted into it and such that in the angular area of the angle shaped line entrance, a disconnect is provided between the two branches so that the two branches are connected on the outside of the angle formed by them so that they can be swung and/or detached, and they can be detachably coupled on the inside of the angle.

An angular line entrance of this general type is known from German Patent DE34 03 772C2. This previously known line entrance has the advantage that a rigid angular line entrance can be constructed with branches that are arranged fixed relative to each other, i.e. an exactly predetermined angle is maintained. In spite of this, however, the introduction of the cable is made easier in that the angle branches can be folded or brought into a position in approximate alignment to each other. Thus by the arrangement of the two branches at the predetermined angle, transverse forces can also be received. Especially oblong structures, which completely or almost completely fill the inner cross section of this angular line entrance, can be inserted when the branches are first folded apart or opened, and after that the angle branches are brought into their angular position and coupled into position. This coupling of the two angular branches can, however, not be opened again or only opened again with difficulties and under certain circumstances, by destroying them, so that though the assembly and introduction of the oblong structure is made easier, disassembly is not possible or only possible by destroying the angular line entrances, so that it becomes unusable after such a disassembly.

SUMMARY OF THE INVENTION

Therefore the object of the invention is to create an angular line entrance of the above-named type, which has the advantages of the simple assembly for somewhat aligned branches, however, also then allows a simple disassembly without destroying the line entrance. Especially, simultaneously the handling of the coupling of the two branches on the one hand and the clamping of the oblong structure on the other hand, on the branch of the line entrance facing away from housing or the wall, should be simplified for the user.

In order to solve this apparent contradictory task, the angle shaped line entrance having two branches that are at an angle to each other is characterized in that on or in a first branch that is spaced at a distance from the wall or the housing, a clamp or clamp insert for the oblong structure, which can be adjusted by an activation component, and a coupling part for connecting to the second branch in a manner that can be detached are provided, and that the activation component and the coupling part are in such an effective connection that the activation of the activation component for the attachment of the clamp or the clamp insert to the oblong structure also activates the coupling part for connecting the two branches.

Thus, on the first leg of the angle shaped line entrance, any desired clamping device that is known from the state of the art can be provided in the form of a clamp or a clamp insert, as are known for the attachment or for the strain relief on such oblong structures, especially on corrugated hoses or cables. In an expedient and advantageous manner, the activation of such a clamping device or an activation component present for it can thus simultaneously be used to create the coupling connection between the two branches of the angle shaped line entrance that are arranged at an angle to each other. Thus, the operation used for attaching or clamping the oblong structure automatically onto the reciprocal coupling, can be used for connection or locking of the two angle-branches. In this way, the handling of the locking or coupling on the one hand, and the attachment of the oblong structure or cable on the other hand, can be considerably simplified for the user. Furthermore, by this combining of the movement of the activation component for the clamping operation and for the coupling, the possibility also results for not only releasing the oblong structure again in the reverse case during disassembly, but also again detaching the coupling between the two branches.

It is especially expedient therefore, if the activation component for the clamp or the clamp insert is connected with the coupling piece in a friction fit manner. In this way, the possibility occurs of moving the activation component even further in order to increase the clamping, even if the coupling position between the two branches has been achieved, such that during this additional movement, only the frictional force must be overcome. By an opposing movement, on the other hand, this friction fitting can also be used to detach the coupling between the two branches.

An especially favorable constructive embodiment of the angle shaped line entrance according to the invention can be characterized in that in or on the first branch that faces away from the wall or the housing, a clamp that can be deformed in the radial direction, or a radially deformable clamping insert, can be provided in order to attach the oblong structure in the area of this first branch and as an activation component for this, a rotating sheath or union nut is provided, and further at the transition or contact position between this first branch and the second branch, a sash-type lock is provided on the first branch as a coupling piece, that in the coupling position the grasps behind a projection, which is arranged on the second branch that can be connected to the wall or the housing and which functions as an opposing coupling piece, and that the sash-type lock and the rotating sheath or union nut are connected via a friction coupling in a friction fit manner so that when rotating the rotating sheath or union nut into its clamping position, the sash-type lock can be guided along into its coupling or locking position.

In this case, a clamp or a clamp insert is thus provided which can be deformed in the radial direction using a rotating sheath or union nut, i.e. through a screwing movement and conical surfaces that are known, clamping fingers of the clamp or the clamping insert can be deformed by the overlapping rotating sheath or union nut because of its axial movement even in the radial direction and pressed against an oblong structure or brought into contact on a corrugated hose, as is known in various forms from the state of the art for so-called cable screw connections or hose connections. In a constructively simpler and thus more advantageous way, the effective connection is achieved with the coupling piece for connecting the two branches in that a sash-type lock is provided, with which the rotating sheath or union nut is connected via a friction coupling in a friction-fit manner so that a sash-type lock of this type can be carried along in the rotational direction when clamping the oblong structure because of this friction fit, until the locking or coupling position is achieved. In an expedient manner, if necessary, the rotating sheath or union nut can be further rotated, however, in that only the frictional force on the one hand and the increasing clamping force, on the other hand, are overcome, if the attachment of the oblong structure requires an additional screw tightening of the rotational sheath or union nut. Vice-versa, it is sufficient to turn back the rotating sheath or union nut in the opposite direction in order to simultaneously bring the sash-type lock in to the open position via the friction fitting, i.e. to detach both branches from each other, when the oblong structure is also freed again from out of its clamping. Thus, a very simple and effective double function of the rotating sheath or union nut, and at the same time, a simple activation for connecting the two branches in their angular position relative to each other and when attaching an oblong structure, hose or cable, result.

It can therefore be expedient, if on the first branch, a stopper is provided for a locking projection of the sash-type lock, which limits its movement or rotation in the locking position opposite the activation component or the rotating sheath or union nut, and if the activation component can be moved, in order to clamp the oblong structure, over a larger path or rotational angle than the coupling part or the sash-type lock. A coupling part of this type, in particular a sash-type lock, needs namely merely to be able to be turned by a relatively small angle from an open position into a locking or coupling position, whereas for a clamping of an oblong structure, under certain circumstances a larger rotation, or even several rotations, are functional on a corresponding rotating sheath or union nut, especially in consideration of oblong structures having various cross-sections or diameters. By the arrangement according to the invention, a coupling of the two movements results, on the one hand, for the connection of the two branches to each other and on the other hand, for the connection of the oblong structure in first branch, without that in the process, however, one rotational movement limits the other one.

Another embodiment of the invention, of considerable significance, can consist in that in the area of the stopper for a locking projection, a catch projection that is grasped from behind in the coupling position by the sash-type lock via a catch tooth is arranged, and that the friction between the activation component—i.e. in particular, a rotational sheath or a union nut—and the sash-type lock is larger than the opposing force that occurs when the sash-type lock is swung into its locking position grasping behind the catch projection. In this way, it can be achieved that when the activation component, i.e. the rotational sheath or union nut, is turned, at first the locking of the two angle branches occurs and the clamping only begins in the locked and simultaneously also caught position of the sash-type lock, when the activation component is then turned further, in order to also apply the clamping force.

An additional embodiment can provide that the catch projection, which can be overcome when turning the sash-type lock in the locked position, sets a larger force of resistance against the return rotation into the uncoupled position, than the uncoupling out of the clamping position of the activation component, in particular, of the rotational sheath or union nut. Catch projections can be designed in a known way so that they can be overcome in one direction as in the opposite direction. By the additional measures mentioned, it results that during the opposite activation of the activation components from the clamping and mounting position into the open position, at first the attachment or clamping of the oblong structure or cable is released before the two branches of the angular line entrance are again detached, uncoupled, or unlocked from each other. Thus, also under certain circumstances, only the clamping can be uncoupled, without uncoupling the two branches. If, however, after detaching the clamping, an uncoupling also should occur, the activation component needs only to be moved further or turned further with a somewhat higher force in the opening direction, in order to overcome this catch in the detachment direction and thus also to bring the sash-type lock into the open position.

Additional embodiments of the line entrances according to the invention include the following.

An expedient embodiment of the invention provides a stopper on the angular branch in order to limit the movement of the sash-type lock in connection with a catch in the coupling position.

Another especially expedient embodiment provides the sash-type lock itself as a ring or ring-shaped disk having a rotating bearing in the form of a support, which at the same time can create the aforementioned frictional connection to the rotational sheath or union nut.

Another especially expedient embodiment provides a reciprocal arrangement of the friction-fit connection between the rotational sheath or union nut and support arranged on the disk-shaped sash-type lock.

Another expedient embodiment contains a measure which allows a clamping device on a support that rests on a housing or a wall, in which the rotational direction can occur for the locking or clamping movement in the usual direction, for which purpose, however, a left-handed thread is necessary.

On the whole, especially in combinations of individual or several of the characteristics and measures described above and contained in the claims, an angle shaped line entrance results, in which the two branches of this line entrance can be coupled together so that they can be detached and the coupling movement can be performed automatically with the movement necessary for the attachment or the clamping of the line or the oblong structure, such that, however, the attachment and detachment of the oblong structure can also be done without a detachment of the coupling between the two branches.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 7 is a perspective view of the angle shaped line entrance in accordance with FIG. 3, shown disassembled, viewed essentially from the side and somewhat at an angle from the side provided for the introduction into a hole of a housing.

DESCRIPTION OF THE INVENTION

Figure 1:
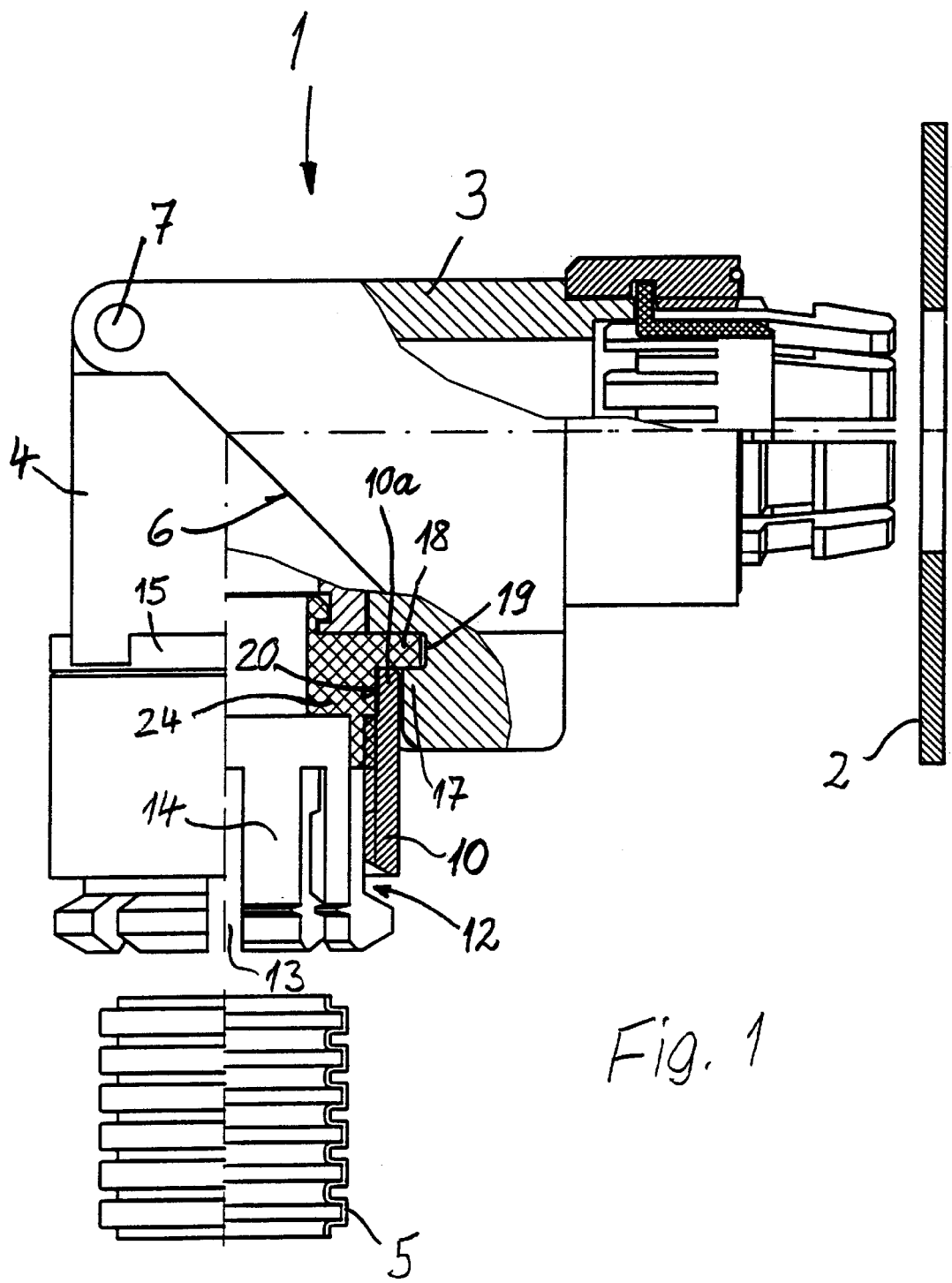
FIG. 1 is a side view, partially broken away, and in the area of this breakaway, a side view shown in cross-section, of an angle shaped line entrance according to the invention, having two branches at an angle to each other, for the insertion and attachment of flexible oblong structures, in the embodiment example, a corrugated hose, to a wall or a housing with an opening, prior to being caught and clamped to the opening in a housing wall and prior to the insertion or attachment of the branch into or onto the branch that faces away from the housing wall, where the two branches, which can be moved relative to each other on an axis, are swung and coupled together or connected in a detachable manner in the usage position.

A line entrance which is identified as a whole by 1 has essentially two branches that are set at an angle to each other, namely on one side, a second branch 3 that can be attached and mounted on a wall 2 or a housing that includes the wall 2, and a first branch 4, which is set at a right angle to the second branch 3 in the usage position, for the insertion and/or attachment of flexible oblong structures. In the present embodiment, a corrugated hose 5 is attached at an angle in, through, or on the wall 2 or the housing. In this way, it will be recognized in the FIGS. 1 and 2, that the corrugated hose 5 is attached only on the first branch 4 in its inner longitudinal cavity so that a cable could be laid through it and the line entrance 1, if necessary. It is, however, also possible from the beginning to attach a cable using this line entrance 1 to a wall 2 and to conduct it through the line entrance 1 and thus, using the line entrance 1 and the first branch 4, to provide a strain relief.

Figure 2:
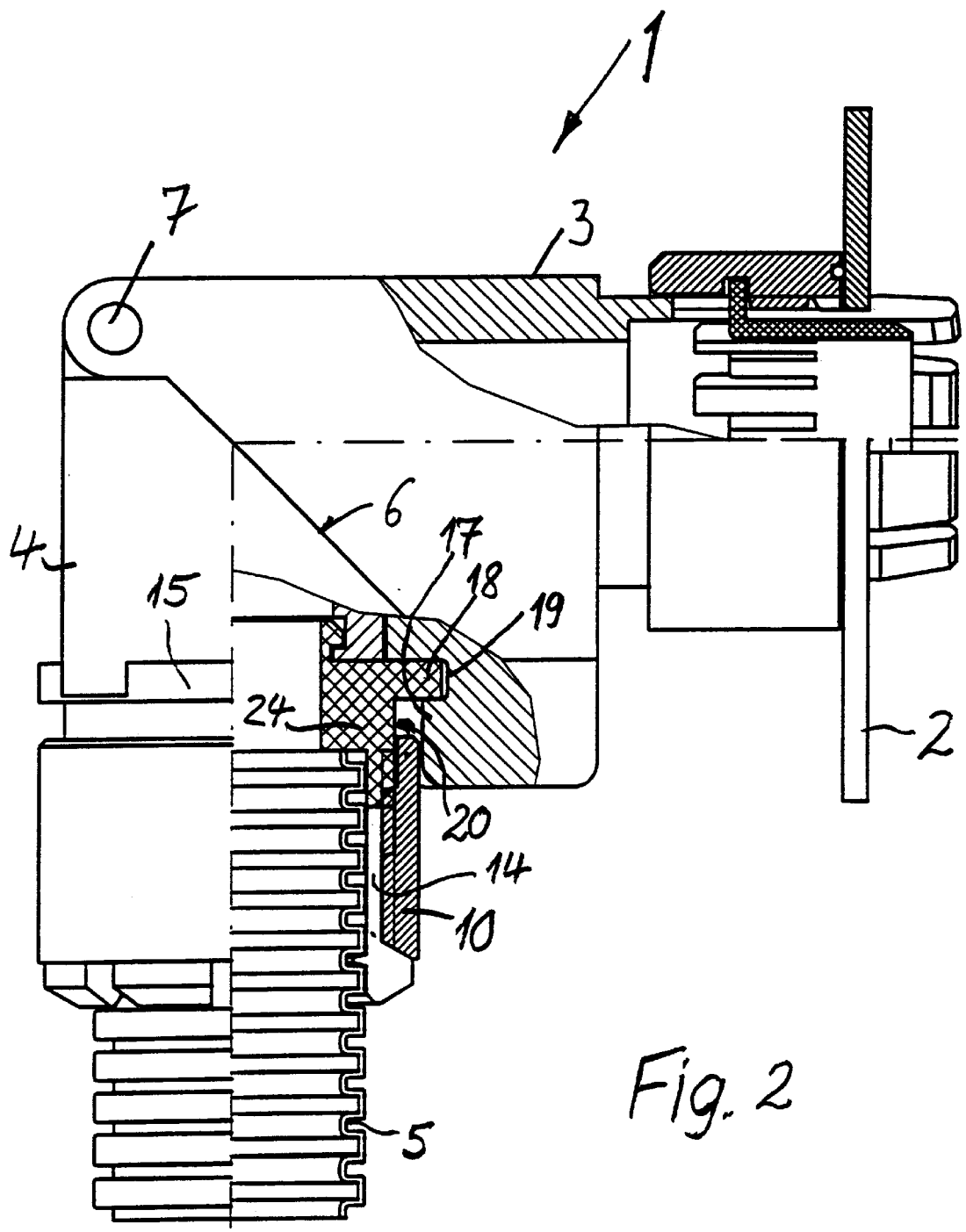
FIG. 2 is a view corresponding to FIG. 1 of the angular line entrance after the attachment of one branch to an opening of the wall and after the attachment of a corrugated hose on and within the second branch.
Figure 4:
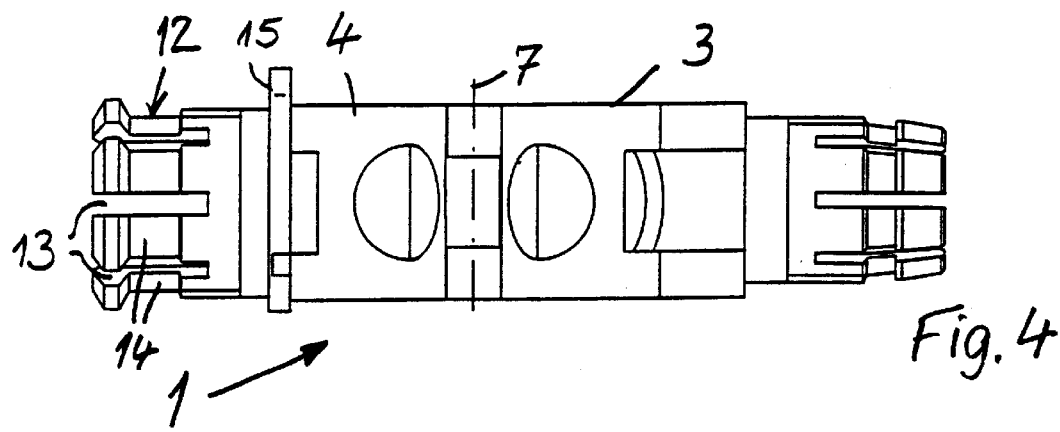
FIG. 4 is a view of the line entrance when the branches are aligned with a view of the surfaces that contact each other in the usage position, taken along lines 4—4 in FIG. 3.
Figure 3:
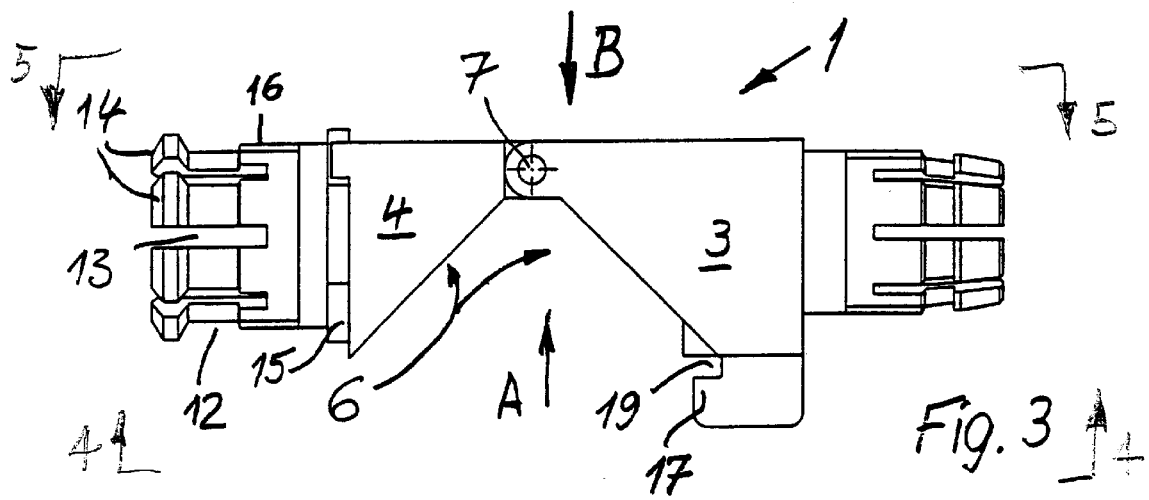
FIG. 3 is a side view of the angular line entrance after the detachment of the coupling between the two branches and the folding out from each other into a position, in which the two branches are attached on their common pivot axis, but have a direction that agrees, i.e. are aligned with each other so that a cable to be laid through the entire line entrance, or the equivalent, can be linearly inserted into both branches.

According to FIG. 2, the oblong body, i.e. a corrugated hose 5, runs approximately parallel to the surface of the wall 2, while the continuation through the line entrance 1, i.e. for example, a cable that is introduced through the first and second branch, and in the embodiment example in any case the second branch 3, enters at a right angle into the line entrance. The bending area of an oblong structure of this type, which runs through the entire line entrance, is thus enclosed by this line entrance 1. In the angular area of this angle shaped line entrance 1 a disconnect 6 is provided between the two branches 3 and 4 which is recognized especially well in FIGS. 3 and 7, since the two branches 3 and 4 are connected to each other so that they can be swung outwardly from the angle position formed by them, about a transverse axis 7 running outside of their longitudinal center, transverse to the center axes of the branches 3 and 4, and can be detachably coupled on the inside of the angle when the disconnect 6 is closed according to FIGS. 1 and 2 in the manner to be described below.

Figure 5:
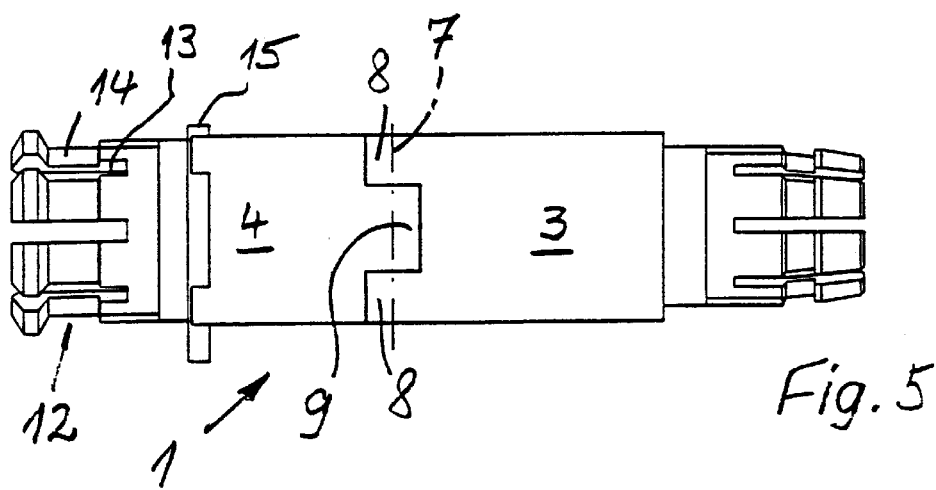
FIG. 5 is an overhead view of the arrangement according to FIG. 3 taken along lines 5—5 in FIG. 3.

The angle shaped line entrance 1 can also be swung out of the usage position according to FIGS. 1 and 2, in which its two branches 3 and 4 are at an angle to each other and connected together, after the detachment of the coupling between the two branches 3 and 4, into a position in which the two branches 3 and 4 according to FIGS. 3 to 7, are aligned along their inner longitudinal cavities. The inner longitudinal cavities are separated in the area of the disconnect 6, such that in the area of this disconnect 6 moreover, the transverse axis 7 for the inner longitudinal cavities runs to the side of them. In FIG. 5, the connection of the two branches 3 and 4 in the area of the transverse axis 7, which is constructed in an approximately hinge-like manner, can be recognized. This hinge connection can moreover, be seen more clearly in FIG. 7, where from the second branch 3, projections 8 are arranged on both sides of an opposing projection 9 of the first branch 4 and the transverse axis 7 passes through all of the projections 8 and 9.

On the first branch 4 spaced at a distance from the wall 2, a clamp 12, for the oblong structure or hose 5 is provided, which is adjustable by an activation component 10, which in the described embodiment is a rotational sheath or nut that is provided with an inner thread 11, also referred to hereafter as the "rotational sheath 10". This clamp 12 is formed by individual clamping fingers 14 that are separated by axial slits 13, but it can also be designed on the whole as a clamping insert, where this clamping insert can be a detached part or a part connected to the branch 4.

The branch 4 has, in addition, a coupling part that is to be described in further detail—in the described embodiment a sash-type lock 15—which functions for the detachable connection to the second branch 3, when the two branches 3 and 4 located against each other in the area of their disconnect 6 according to FIGS. 1 and 2. In a manner that will be further explained below, the activation component 10 and the coupling part constructed as a sash-type lock 15 are in such an effective connection with each other that the activation of the activation component 10 for the fixing of the clamp 12, i.e. for the mounting of the corrugated hose 5 in the usage position according to FIG. 2, at the same time or temporally displaced, activates the coupling piece, i.e. the sash-type lock 15, in the sense of a connection of the two branches 3 and 4. In the following, it is explained in greater detail that the turning of the rotational sheath 10 and its axial movement caused by it because of the threading 11 not only deforms the clamping fingers 14 radially, but also carries the sash-type lock 15 in the rotational direction along with it, in order to bring it into a position in which the two branches 3 and 4 are connected in a friction fit manner via this sash-type lock 15.

In this way, the activation component 10 for the clamp 12—or a possibly otherwise designed clamping insert—is connected in a friction fit manner with the coupling part, i.e. there is a friction coupling between these two parts.

Especially in the combined observation of FIGS. 1, 2 and 7, it is clear that on the first branch 4 facing away from the wall 2 or the housing, a clamp 12 that can be deformed in the radial direction is provided practically as an end of this branch 4 for connection with the corrugated hose 5 or for the clamping with another oblong structure and as an activation component for this, the rotational sheath engaging with an outer threading 16 of the clamp 12 is provided, and additionally, the aforementioned sash-type lock 15 is provided as a coupling piece on the first branch 4 at the transition or contact position 6 between the first branch 4 and the second branch 3.

On the second branch 3 that can be connected or is connected to the wall 2, a projection 17 is provided as an opposed coupling part, which engages behind the sash-type lock 15 in the coupled position according to FIGS. 1 and 2 with a radially projecting locking projection 18. This projection 17 on the second branch 3 which forms the opposing coupling is thus the outer limit of a groove-shaped recess 19 which can be recognized especially well in FIG. 6. In the same manner, it will be clearly recognized from FIG. 6 that the locking projection 18 is located on the sash-type lock 15, which projects radially compared to the remaining part of the sash-type lock 15, in order to be engageable in the recess 19 behind the projection 17.

The sash-type lock 15 and the rotating sheath 10 are connected in a friction fit manner via a somewhat cylinder-shaped friction coupling 20, for example the cylinder-shaped friction coupling 20 that is shown in FIGS. 1 and 2, so that the previously mentioned effect occurs during the rotation of the rotational sheath 10 into its clamping position, the sash-type lock 15 is carried along into its coupled or locked position. Preferably, the friction force is selected such that the coupling movement occurs prior to the clamping movement. So that in the reverse situation, the detachment of the clamp can occur before or without an unlocking of the coupling between the two branches 3 and 4. Additional measures are provided that are additionally explained in the following.

Figure 6:
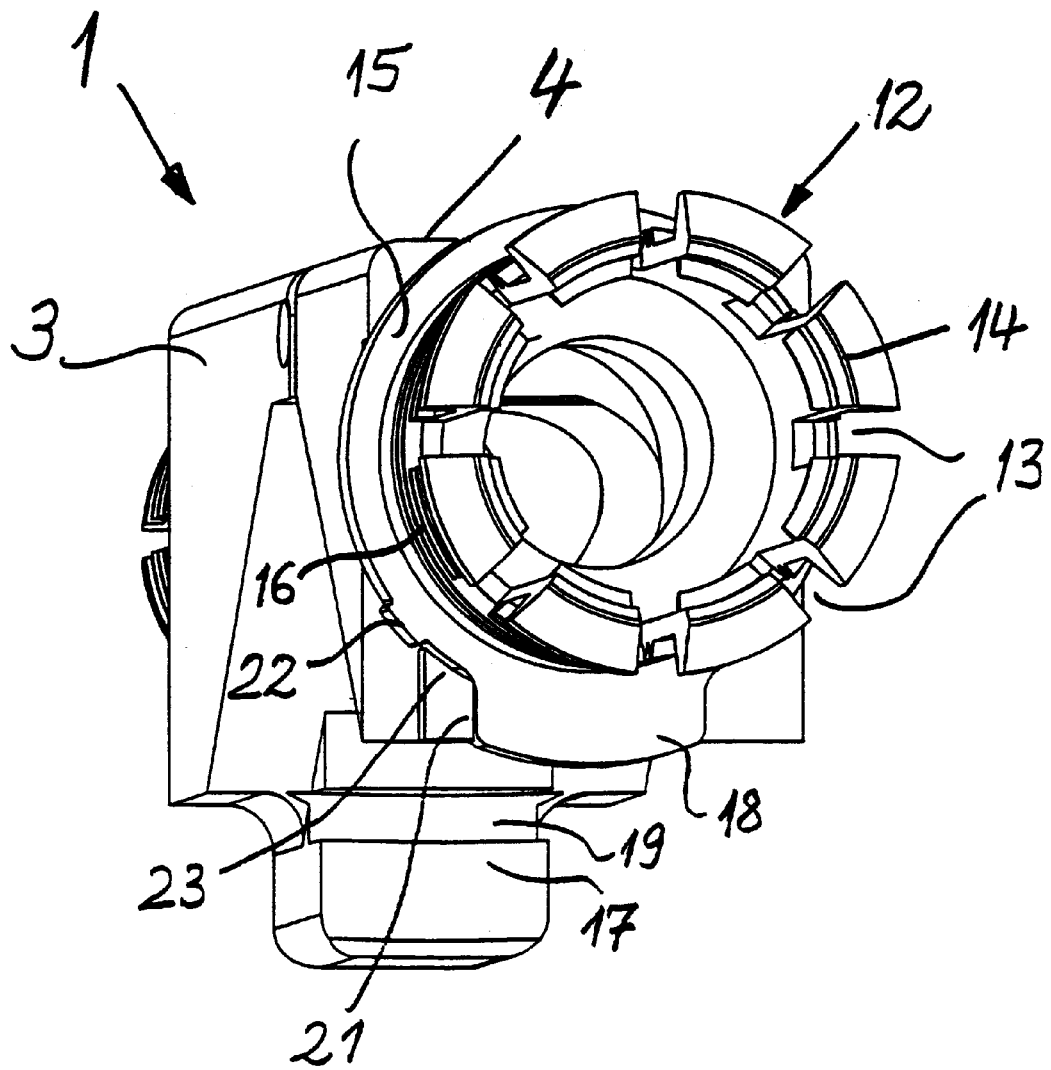
FIG. 6 is an angled perspective view, of the attachment area of the one branch which is planned for the attachment of the corrugated hose or the like, and is provided with clamping fingers that can be pressed together, and at the same time, with a view toward a sash-type lock that is coaxial to them, where also in this diagram both branches of the angular line entrance are folded apart from each other in accordance with FIG. 3 in such a manner that their inner longitudinal cavities are aligned.

First of all, FIG. 6 shows in connection with other figures, that on the first branch 4, a stopper 21 for the aforementioned locking projection 18 of the coupling part or the sash-type lock 15 of the first branch 4, is provided on the first branch 4. In FIG. 6, the position of the sash-type lock 15 is depicted, in which its locking projection 18 rests on this stopper 21 in the rotational direction in such a way that an additional turning of the rotatable angle—in the clockwise direction in the method selected—is not possible. In this position, the locking projection 18 would at the same time mesh into the recess 19 if the two branches 3 and 4 had been folded beforehand into their usage position.

The stopper 21 thus limits the movement or rotation of the sash-type lock 15 in the locking position compared to the activation component, i.e. the rotational sheath 10, which can be rotated even further, in order to affix or clamp the oblong structure, since it only meshes with the sash-type lock 15 in a friction fit manner and this friction can be overcome during the continued turning. The rotational sheath 10 thus has a larger turning angle than the sash-type lock 15.

In the area of the stopper 21 for the locking projection 18, moreover, a catch projection 23 is arranged that is engaged from behind by the sash-type lock 15 in the coupling position via a catch tooth 22, where the catch tooth 22 has a distance from the locking projection 18 in the circumferential direction, which corresponds to the extension of the catch projection 23 in this direction, so that in the locking position, the catch projection 23 comes to lie between the catch tooth 22 and the locking projection 18, as is clearly shown in FIG. 6.

In addition, FIG. 6 shows that in the described the stopper 21 arranged affixed to the first angle branch 4, in order to limit the rotational movement of the sash-type lock 15 and the locking projection 18 projecting radially opposite it, is at the same time constructed as a catch projection 23 and has a radial dimension of a type such that the catch tooth 22, located on the circumference of the sash-type lock 15 in the rotational direction, before the locking projection 18 of the sash-type lock 15 which projects out radially, can be moved past the locking projection 23 in a locking manner. It is readily apparent that the catch tooth 22 of the sash-type lock 15 projects in the radial direction only relatively slightly so that the catch projection 23 can be overcome during turning in order to occupy the catch position. In this way, the friction between the activation component or the rotational sheath 10 and the sash-type lock 15 is larger than the opposing force occurring during the engagement of the sash-type lock 15 into its locking position grasping behind the catch projection 23. In the reverse situation, this catch prevents, when detaching the clamping fingers 14 from their mounting position, that the two branches 3 and 4 are uncoupled. The catch projection 23 that can be negotiated around when turning the sash-type lock 15 into the locking position, namely causes a larger resistance force than occurs through the detaching of the activation component or the rotational sheath 10 from out of their clamping position, to oppose turning backwards into the detached position.

FIG. 6 makes clear that the sash-type lock 15 is constructed on the whole as an approximately ring-shaped disk, on the circumference of which the locking projection 18—and in the described embodiment, also the catch tooth 22—projects radially, while from FIGS. 1 and 2 it is clear that this disk forming the sash-type lock 15 has in the area of its rotating bearing, a support 24 that also extends axially and that thereby extends to both sides of the actual ring-shaped disk of this sash-type lock 15, in order to on the one hand, obtain an attachment through a catch on the inside of the first branch 4, whereas especially, the essential part of this support 24 is directed in the axial direction at the end of this branch 4. Onto this, an end area 10a of the rotating sheath 10 meshes in a friction fit manner, so that the turning of the rotational sheath 10 also, for a certain axial adjustment accompanied by this, carries this support 24 and thus the sash-type lock 15 along with it as far as it will go until the stopper 22 stops any additional turning. The rotational sheath 10 is then able to be further turned towards this locking position of the sash-type lock 15, where only the frictional force between the end area 10a and the support 24 must be overcome.

The end area 10a of the rotational sheath 10 takes up the support 24 with it in the area of the opposing side friction fit connection and impinges it in this manner on the outside. An opposite arrangement would also be conceivable, in which a corresponding ring area of the rotational sheath 10 meshes in a friction fit manner into an area of the support 24 that fits it.

The screw sheath 10 used in the described embodiment is moved away in the axial direction from the common connection position of the two angle branches 3 and 4 for the radial deformation of the clamping fingers 14 in order to bend the radially expanding clamping fingers inwardly in this way via conical surfaces. In this way, it is provided in the described embodiment that the one movement for this rotation and thus also the rotation of the sash-type lock 15 into its locked position is done in the clockwise direction, when viewed from out of the opening of the branch 4 to the sash-type lock 15. Accordingly, the threading 16 is a left-handed threading.

The shape of the clamping fingers 14 has the advantage that they can, during a return adjustment of the rotational or screw sheath 10 away from the ends of these clamping fingers 14, also get out of the way radially outwardly in order to be able to pull the corrugated hose 15 out again.

On the second branch 3, on the other hand, a clamping device is arranged in which the clamping fingers provided there are moved radially outwardly in the usage position, so that they can grasp behind the hole in the wall 2 according to FIG. 2 with the corresponding projections lying outside.

The angle shaped line entrance 1 has two branches 3 and 4 at angles to each other and functions for the attachment to a wall 2 or a housing in the area of a corresponding hole-shaped opening. In this way, oblong structures, for example, hoses 5 or cables or the like, can be guided and affixed on or through this wall 2, such that the corresponding oblong structures enter into the first branch 4, while the second branch 3 itself is connected to the housing or its wall 2. In the angular area, the two branches 3 and 4 can be swung relative to each other, so that they can also take on an aligned position.

Locking in the angular usage position is done by coupling via a movement for the attachment of the oblong structure at least in the first branch 4, in such a way that both movements can be performed with the same activation component. The disconnect 6 between the two branches can thus run approximately on an angle bisecting line between the two branches.

What is claimed is:

1. An angle shaped line entrance (1) for attachment of an oblong structure (5) to a wall (2) comprising:
    a first branch (4) spaced apart from the wall (2), the first branch (4) having a coupling part (15);
    a second branch (3), pivotally connected to the first branch (4) on an outside of an angle formed by the first and second branches (4, 3), to move between a first position spaced apart from the first branch and a usage position wherein said first and second branches are coupled together, said second branch having a projection (17, 19) being detachably couplable on an inside of the angle to the coupling part (15) of the first branch when in the usage position;
    an adjustable clamp (12) extending from the first branch into which the oblong structure (5) is removably insertable and attachable; and
    an activation component (10) slideably connected to the coupling part (15) and to the adjustable clamp (12), wherein movement of the activation component (10) attaches the adjustable clamp (12) to the oblong structure (5) and moves the first coupling part (15) into coupled engagement with the projection (17) to secure the first and second branches (4, 3) in the usage position.

2. The line entrance according to claim 1, wherein the activation component (10) for the adjustable clamp (12) is frictionally connected to the coupling part.

3. The line entrance according to claim 1, wherein
    the second branch (3) is removably connectable to the wall (2);
    the adjustable clamp (12) is recoverably deformable in a radial direction to secure the oblong structure (5) to the first branch (4), whereby movement of the activation component (10) results in the adjustable clamp (12) deforming radially to either grasp the oblong structure (5) or release the oblong structure (5), dependent upon a direction of movement of the activation component (10), the coupling part is (15) engageable, in a coupled position, behind the projection (17) of the second branch (3), the activation component (10) is a rotating sheath (10) frictionally connected to the coupling part (15) whereby rotation of the rotating sheath (10) to a clamping position, moves and rotates the coupling part to the coupled position.

4. The line entrance according to claim 3, wherein the rotating sheath (10) is rotatable over a larger angular path than the coupling part (15),
    the first branch (4) has a stopper (21), and
    the coupling part (15) has a locking projection (18), whereby, in the coupled position, rotation of the coupling part (15) is stopped by the stopper (21).

5. The line entrance according to claim 4, wherein
    a catch projection (23) is arranged in an area of the stopper (21) for the locking projection (18),
    the coupling part (15) has a catch tooth (22) that engages the catch projection (23) from behind when the coupling part (15) is in the coupled position, and
    a first friction force between the rotational sheath (10) and the coupling part (15) is larger than a second friction force between the catch tooth (22) and the catch projection (23) that occurs while the catch tooth (22) is swung into a locked position engaged behind the catch projection (23).

6. The line entrance according to claim 5, wherein a first force applied to the rotational sheath (10) to disengage the catch tooth (22) from behind the catch projection (23) is greater than a second force applied to the rotational sheath (10) to uncouple the rotational sheath (10) from a clamping position.

7. The line entrance according to claim 6, wherein the catch projection (23) is a radially inward projecting portion of the stopper (21), and the catch tooth (22) is located on a circumference of the coupling part (15) before the locking projection (18) of the coupling part (15) and projects out radially, whereby the catch tooth (22) is movable past the catch projection (23) into the locked position.

8. The line entrance according to claim 3, wherein the coupling part (15) is a ring-shaped disk having a locking projection (18) projecting radially on a circumference of the ring-shaped disk and a support (24) that extends axially, the support (24) having an end frictionally connected to an end area (10a) of the rotational sheath (10).

9. The line entrance according to claim 8, wherein the end area (10a) of the rotating sheath (10) impinges the support (24) on an outside area thereof.

10. The line entrance according to claim 3, wherein the rotating sheath (10) is rotatable in a clockwise direction as seen from out of an opening of the first branch (4) having the rotating sheath (10), and has a left-handed threading.

* * * * *